United States Patent [19]    [11] Patent Number: 5,016,607
Doolittle et al.                                                                  [45] Date of Patent: May 21, 1991

[54] BARBECUE GRILL ASSEMBLY

[75] Inventors: Frederick G. Doolittle, Dublin; Jon L. Ellgen, Pleasant Hill; Ronald E. Heiskell, Tracy; Lipton, Thomas M., Concord; James R. Parent, Dublin, all of Calif.

[73] Assignee: The Clorox Company, Oakland, Calif.

[21] Appl. No.: 308,256

[22] Filed: Feb. 9, 1989

[51] Int. Cl.⁵ .............................................. A47J 37/00
[52] U.S. Cl. ................................ 126/25 R; 126/41 R
[58] Field of Search ............ 126/25 R, 41 R; 99/445; D7/334; D81/10

[56] References Cited

U.S. PATENT DOCUMENTS

| D. 219,413 | 12/1970 | Glaser et al. | D81/10 |
|---|---|---|---|
| D. 223,042 | 2/1972 | Wilkinson et al. | D81/10 |
| D. 255,863 | 7/1980 | Futch | D7/108 |
| D. 269,839 | 7/1983 | Givens, III | D7/4 |
| D. 295,135 | 4/1988 | Ogden | D7/334 |
| 3,330,266 | 7/1967 | Stephen | 126/25 R |
| 3,611,915 | 10/1971 | Glaser | 99/445 |
| 3,683,791 | 8/1972 | Rast, Jr. | 126/25 R X |
| 3,688,758 | 9/1972 | Stephen, Jr. | 126/41 R |
| 3,714,937 | 2/1973 | Linstead | 126/25 R |
| 3,734,076 | 5/1973 | Kiziol | 126/25 R |
| 3,806,987 | 4/1974 | Koziol | 16/191 |
| 4,331,123 | 5/1982 | Alles et al. | 126/9 R |
| 4,337,751 | 7/1982 | Sampson et al. | 126/25 R |
| 4,390,002 | 6/1983 | Daily, III | 126/25 R |
| 4,453,530 | 6/1984 | Schlosser | 126/25 R |
| 4,523,574 | 6/1985 | Schlosser | 126/25 R |
| 4,635,613 | 1/1987 | Tucker et al. | 126/25 R |
| 4,688,541 | 8/1987 | Stephen et al. | 126/25 R |

FOREIGN PATENT DOCUMENTS

3302838  3/1984  Fed. Rep. of Germany .

Primary Examiner—Larry Jones
Attorney, Agent, or Firm—John A. Bucher

[57] ABSTRACT

A barbecue grill assembly is disclosed including a bowl and domed, free-standing lid mating with each other to form a three-dimensional oval in combination, handles and movable shelves being supported on opposite ends of the bowl by leg assemblies secured to the bowl by saddles, brackets being mounted on the leg assemblies in spaced apart relation less than a corresponding dimension of the lid with extended surfaces and stops for causing the lid to move horizontally along the extended bracket surfaces and then rotate into a generally vertical position in cradled engagement with the brackets, an ash collector unit including vent means being suspended beneath a central portion of the bowl.

34 Claims, 5 Drawing Sheets

BARBECUE GRILL ASSEMBLY

FIELD OF THE INVENTION

The present invention relates to a barbecue grill assembly for cooking foods and more particularly to a portable barbecue assembly adapted for use with particulate fuel such as charcoal briquettes.

BACKGROUND OF THE INVENTION

A wide variety of barbecue grill assemblies have been provided in the prior art for use either with particulate fuels such as charcoal briquettes or liquid fuel.

Many of these barbecue grill assemblies are mounted on wheels to make them portable and facilitate their movement from one location to another, often in outdoor areas of the home.

Such barbecue grill assemblies typically include a bowl-like base mounted on a suitable support such as a central pedestal or legs including wheels to make the unit portable as noted above. Where the barbecue unit is contemplated for use with charcoal briquettes, a cooking grill is normally mounted in the bowl above a fuel grill for receiving the briquettes.

The barbecue units commonly have an enclosure formed between the bowl and a dome-shaped lid with vents regulating the flow of air or oxygen through the interior to adjust the rate of burning of the briquettes.

Operation is further enhanced by providing accessories such as shelves for receiving food containers or cooking utensils. In addition, much of the prior art is directed toward arrangements for facilitating movement of the lid by a user in order to maintain the lid in an open position upon the bowl and allow the user to add food to the cooking grill, rotate food articles already on the grill, replace or add charcoal briquettes and the like.

Representative barbecue grill assemblies of the type referred to above have been disclosed for example in U.S. Pat. Nos. 3,611,915 issued Oct. 12, 1971 to Glaser; 3,688,758 issued Sept. 5, 1972 to Stephen, Jr.; 3,714,937 issued Feb. 6, 1973 to Linstead; 3,734,076 issued May 22, 1973 to Kiziol; 4,390,002 issued Jun. 28, 1983 to Daily, III; 4,453,530 issued Jun. 12, 1984 to Schlosser; and 4,523,574 issued Jun. 18, 1985 also to Schlosser. U.S. Pat. No. 4,635,613 issued Jan. 13, 1987 to Tucker, et al. discloses a barbecue grill with a lid support means comprising clips mounted on a support structure away from the grill. However, it appears necessary for a user to first lift the lid and then insert it into a supported position on the clips.

The examples noted above are merely representative of barbecue assemblies available in the prior art and generally corresponding to the above described features.

The variety of barbecue grill assemblies available in the prior art is indicative of the widespread use and popularity of such units particularly for home or family use. However, there has been found to remain a need for further improvements in the units, particularly for facilitating their use under a wide variety of conditions and to allow the user to employ individual skills or techniques in the preparation of various foods.

SUMMARY OF THE INVENTION

It is therefore an object of the invention to provide an improved barbecue grill assembly capable of further enhancing cooking techniques of various individuals by constructing the barbecue grill assmebly to facilitate its use while allowing the user to properly regulate cooking conditions within the unit.

It is a more specific object of the invention to provide such a barbecue grill assembly including a bowl and domed, free-standing lid mating with each other and having a curved configuration at their intersection and cradle means for allowing a user to open the lid in a normal manner, the cradle means including two brackets having extended surfaces facing each other and spaced apart less than a corresponding dimension of the lid with stop means formed on end portions of the extended surfaces whereby lifting of the lid causes the lid to move horizontally along the extended bracket surfaces and then rotate into a generally vertical position upon engagement with the stop means with the lid being cradled by the extended bracket surfaces and stop means in combination.

Preferably, the bowl and lid have a three-dimensional oval configuration with elliptical openings at their mating intersection, the three-dimensional configuration of the bowl and lid in combination corresponding to rotation of the ellipse about its longitudinal axis. As will be described in greater detail below, the three-dimensional configuration of the bowl and lid combination is believed to be esthetic while also being utilitarian, particularly when the unit is adapted for use with particulate fuels such as briquettes in that briquettes can be arranged more uniformly beneath substantially the entire cooking area of the cooking grill. In addition, the cooking surface of the cooking grill is enlarged laterally, allowing for cooking of larger or more irregular food shapes.

It is a further object of the invention to provide such a barbecue grill assembly including leg assemblies arranged at opposite ends of the bowl, either or both of the leg assemblies being adapted for mounting a handle, shelf and one of the cradle brackets. With the bowl and lid preferably having the three-dimensional oval configuration described above, the leg assemblies are preferably secured to the bowl by saddle means with additional structural means interconnected between remote portions of the legs for assuring structural integrity of the unit.

Each shelf is preferably mounted upon one of the leg assemblies by hinge means for supporting the shelf either in an erect horizontal position or a suspended vertical position.

Even more preferably, the hinge means for each shelf comprises two tubular brackets which are axially movable on respective tubular elements of the leg assembly, pin and slot means being formed in combination by the tubular brackets and respective tubular leg assembly elements for selectively maintaining the shelf in its erect position.

As a further preferred feature, the handle is of a tubular configuration and formed from insulating materials such as wood while being mounted between the tubular elements, the shelf preferably including a cutout for exposing the handle with the shelf either in its erect or suspended position.

It is yet another object of the invention to provide a barbecue grill assembly of the type generally referred to above, preferably with leg assemblies secured adjacent opposite end portions of the bowl or a support structure permitting access below a central portion of the bowl for an ash collector assembly, the ash collector assembly preferably including a vertically arranged tubular element including adjustable vent means and self-cleaning attachment means beneath the tubular element for releasably securing an ash collector tray in place thereunder.

Various of the features summarized above may be employed in different combination with each other within the scope of the invention. In addition to varying the combination of such features within the barbecue grill assembly, additional variations and modifications are suggested by the following description having reference to the accompanying drawings.

DESCRIPTION OF THE PREFERRED EMBODIMENTS

Figures 1, 2, 3:
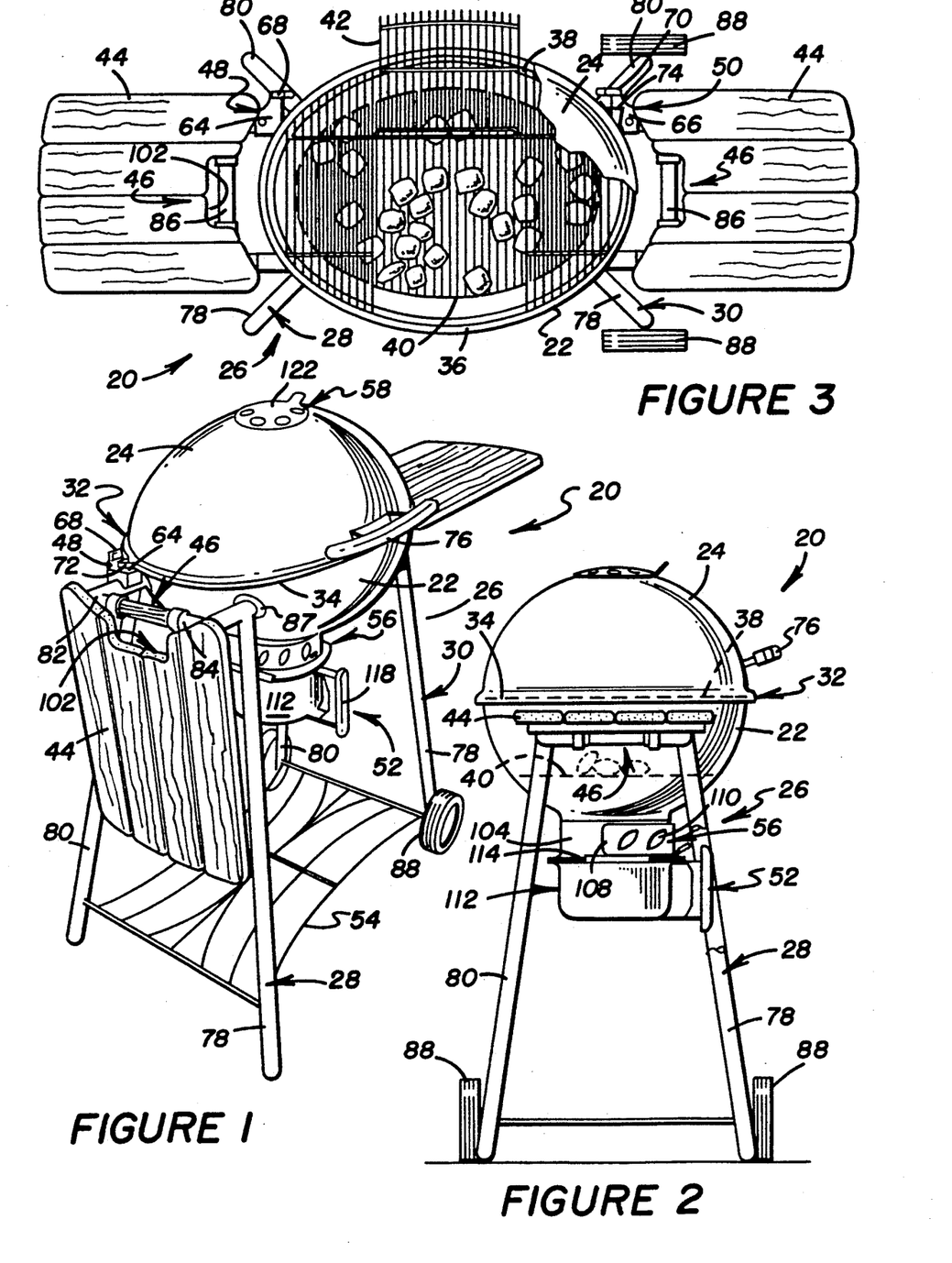
FIG. 1 is a pictorial representation of a barbecue grill assembly constructed according to the present invention with a bowl and domed, free-standing lid forming a three-dimensional oval configuration, a movable shelf on one leg assembly being illustrated in an erect horizontal position while a similar movable shelf on the other leg assembly is illustrated in a vertical suspended position.
FIG. 2 is a side view of the barbecue grill assembly of FIG. 1 in order to better illustrate the three-dimensional configuration of the bowl and lid in combination.
FIG. 3 is a top view of the barbecue grill assembly generally illustrating the elliptically configured opening for both the bowl and lid at their intersection.

Referring now to the drawings and particularly to FIG. 1, a barbecue grill assembly constructed according to the present invention is generally indicated at 20 and includes a bowl-like member 22 and mating, domed, free-standing lid 24. The bowl 22 is mounted on a support structure 26 including leg assemblies 28 and 30 preferably arranged at opposite ends of the bowl 22.

The bowl 22 and 24 lid intersect at 32 with the lid 24 having a slightly larger flanged edge 34 to fit over a mating flanged edge 36 on the bowl. The flanged edge 34 of the lid is illustrated in FIGS. 1 and 2 with the flanged edge 36 of the bowl being illustrated in FIG. 3.

As is also illustrated in FIG. 3, the intersecting opening or openings 32 for the bowl and lid are curved and preferably have an elliptical configuration both to enhance appearance of the barbecue grill assembly and also to facilitate cooking of food in the grill assembly 20. Referring particularly to FIGS. 1 and 2, the bowl 22 and lid 24 have a three-dimensional shape in combination corresponding to rotation of the elliptical opening 32 about its longitudinal axis.

Referring in combination to FIGS. 2 and 3, a food grill 38 is arranged in the bowl on the brackets (not shown) above a lower grill 40 for receiving particulate fuels such as charcoal briquettes.

As may be seen in both FIGS. 2 and 3, the elliptical, three-dimensional configuration of the bowl 22 permits the fuel grill 40 to extend almost entirely beneath the upper food grill 38, particularly a central cooking area most often used in such barbecue grill assemblies. The upper food grill 38 is also formed with a hinged portion 42 in the central cooking portion of the grill. Accordingly, a user may move food products away from the hinged grill portion 42 and then raise that portion of the grill in order to adjust charcoal briquettes or add additional briquettes as necessary without substantially disturbing food cooking on the upper grill 38.

Additional features of the barbecue grill assembly 20 are summarized immediately below and described in greater detail thereafter. Initially, the leg assemblies 28 and 30 are each formed as relatively unitary structures from tubular metal and serve a combined function of supporting the bowl 22, mounting a movable shelf 44 as well as a handle 46. The movable shelf 44 and handle 46 could be aranged on only one of the leg assemblies if desired.

In addition, the two leg assemblies 28 and 30 additionally mount cradle brackets 48 and 50 which support the lid 24 on the bowl 22 when the lid is opened by the user.

With the leg assemblies 28 and 30 being arranged at opposite ends of the bowl 22, an ash collector assembly 52 is suspended from a central portion of the bowl 22 for receiving ashes from consumed briquettes or other fuel in the bowl.

The construction of the leg assemblies 28 and 30 is even more preferably selected for facilitating mounting of the leg assemblies on curved surfaces of the bowl 22. An additional structural member such as a wire shelf 54 is interconnected with the lower ends of the leg assemblies 28 and 30 remote from the bowl 22 in order to further enhance structural rigidity of the leg assemblies in combination with the bowl. Without the wire shelf 54, weight on an oval or elliptical bowl could cause the leg assemblies 28 and 30 to shift or spread, resulting in distortion of the bowl 22. This is prevented by the wire shelf which acts in tension to prevent spreading of the leg assemblies or distortion of the bowl 22.

The ash collector assembly 52 also includes a novel vent assembly 56 described in greater detail below. Another vent 58 is arranged on a central portion of the lid 24. Both of the vent assemblies 56 and 58 are adjustable in order to regulate the amount of air or oxygen passing through the interior of the bowl and lid in order to control burning of briquettes therein.

The components of the barbecue grill assembly as summarized above are described in greater detail below.

Figures 7, 8:
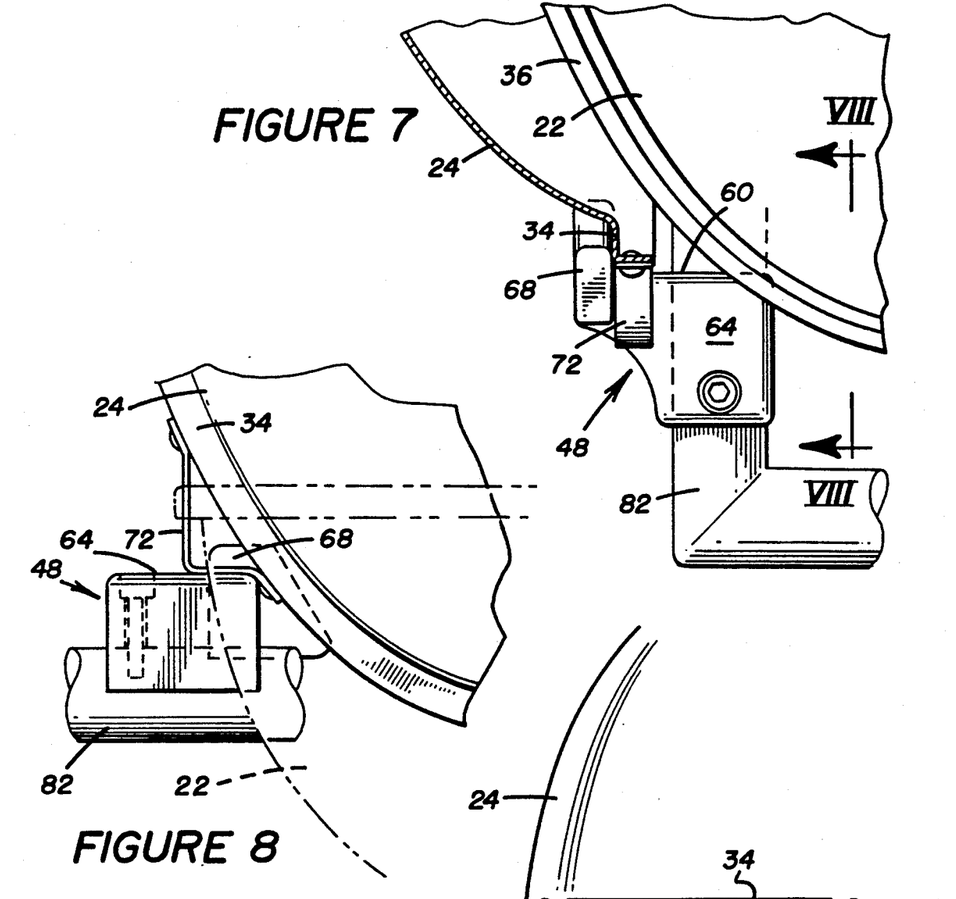
FIG. 7 is a view taken along section lines VII—VII in FIG. 5 to provide a detailed top view of the bracket.
FIG. 8 is a view taken along section line VIII—VIII of FIG. 7 to better illustrate a rounded or beveled extended surface on the bracket and positioning of guide projections of the lid on an upper surface of the bracket.

The cradle brackets 48 and 50 are positioned in fixed relation to the bowl 22, preferably by being mounted on the respective leg assemblies 28 and 30. The two cradle brackets 48 and 50 are formed with elongated or extended surfaces 60 and 62. The cradle brackets 48 and 50 are positioned upon the respective leg assemblies 28 and 30 so that the extended surfaces 60 are fixed apart from each other by a distance somewhat less than a corresponding dimension of the bowl and lid as may be best seen in FIG. 3. The surfaces 60 and 62 are preferably rounded or beveled as illustrated in FIG. 8 while being arranged slightly beneath the flanged edge 34 of the lid when the lid 24 is normally positioned upon the bowl 22 as illustrated in FIGS. 1 and 2.

Each of the cradle brackets 48 and 50 is also formed with a top surface 64 or 66 for engaging guide projections on the lid 24 as described in greater detail below. Projecting stops 68 and 70 are arranged or formed on the extended ends of the cradle brackets 48 and 50 to further facilitate cradling of the lid 24 on the brackets in a manner described below.

The guide projections referred to above are illustrated at 72 and 74 and are mounted on the flanged edge 34 of the lid for engaging the upper or top surfaces 64 and 66 respectively of the cradle brackets 48 and 50 in order to better assure that the lid 24 remains in proper alignment with the cradle brackets 48 and 50. However, the guide projections 72 and 74 could also be integrally formed by the flanged edge 34.

The cradle brackets 48 and 50 are also arranged on a side portion or back of the bowl 22 opposite a handle 76 on the lid 24. In operation, when a user wishes to open the barbecue grill assembly, he normally grasps the handle 76 and raises it toward an initial position illustrated in FIG. 4 with the lid flange 34 and guide projections 72 and 74 respectively engaging the extended surfaces 58, 60 and the upper surfaces 64, 66 on the cradle brackets 48 and 50.

Figures 4, 5, 6:
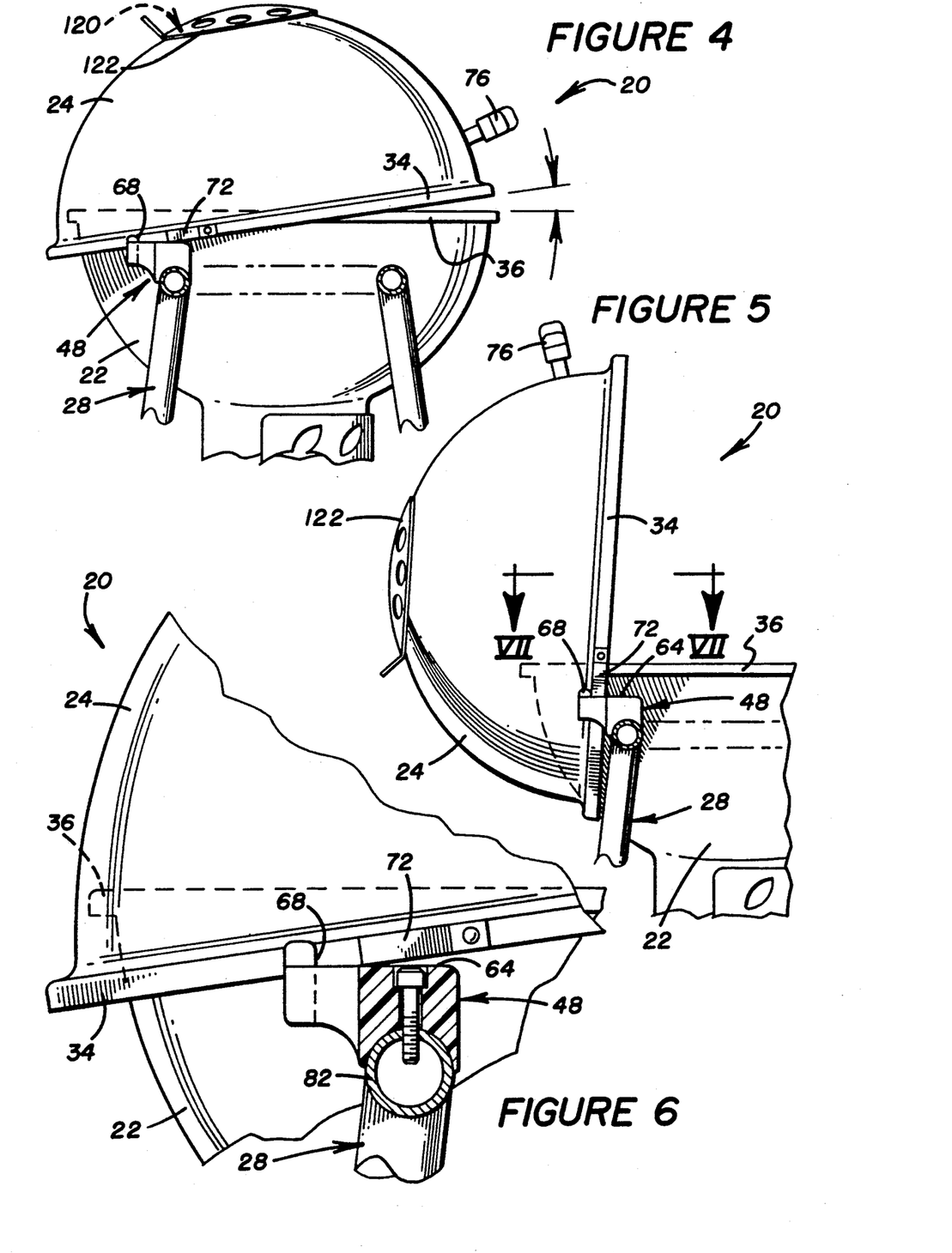
FIG. 4 is a partial side view of the barbecue grill assembly with the lid partially open to illustrate its initial engagement with the cradling brackets.
FIG. 5 is a view similar to FIG. 4 but with the lid fully open and cradled on the brackets.
FIG. 6 is an enlarged fragmentary view, similar to FIG. 2, illustrating one of the brackets with the lid partially open as in FIG. 4.

As the user continues to raise the lid from the position illustrated in FIG. 4 toward the open position in FIG. 5, the flanged edge 34 on the lid tends to slide along the extended surfaces 60 and 62 of the cradle brackets until it engages the projecting stops 68 and 70. The lid 24 is then positioned generally vertically with the entire interior of the bowl 22 being exposed as illustrated in FIG. 5. At the same time, the flanged edge 34 of the lid is cradled between the extended surfaces 60, 62 and the projecting stops 68 and 70 on the cradle brackets 48 and 50. A portion of the lid flange 34, opposite the handle 76, rests against the bowl 22 when the lid is in its open or vertical position.

During movement of the lid from the closed position of FIG. 2 through the partially open position of FIG. 4 and into the fully opened position in FIG. 5, the guide projections 72 and 74 remain engaged with the upper surfaces 64 and 66 of the cradle brackets 48 and 50 so that the lid remains in properly cradled orientation with the brackets 48 and 50.

The cradle brackets 48 and 50 are preferably formed or cast, for example, from a suitable heat resistant material such as a plastic of the like. The bracket material is sufficiently resilient to avoid scratching or marking the metal surface of the lid 24. As may be seen in FIGS. 4-6, each of the cradle brackets 48 and 50 is formed with an arcuate depression for receiving a respective tubular portion of the leg assembly 28 or 30 upon which it is positioned.

At least one and preferably both of the leg assemblies 28 and 30 additionally provide support mounting for a movable shelf 44 and handle 46. Since the two leg assemblies 28 and 30 are of generally similar but mirror image constructions, only the leg assembly 28 is described below with the other leg assembly 30 including similar components.

Figure 9:
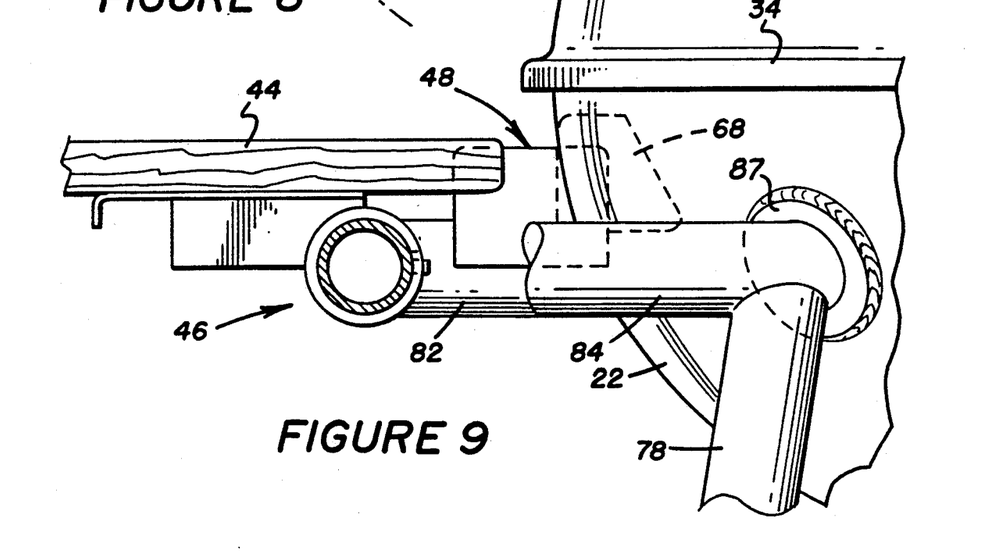
FIG. 9 is a fragmentary view of one leg assembly with the corresponding shelf being in its erect position.
Figures 10, 11:
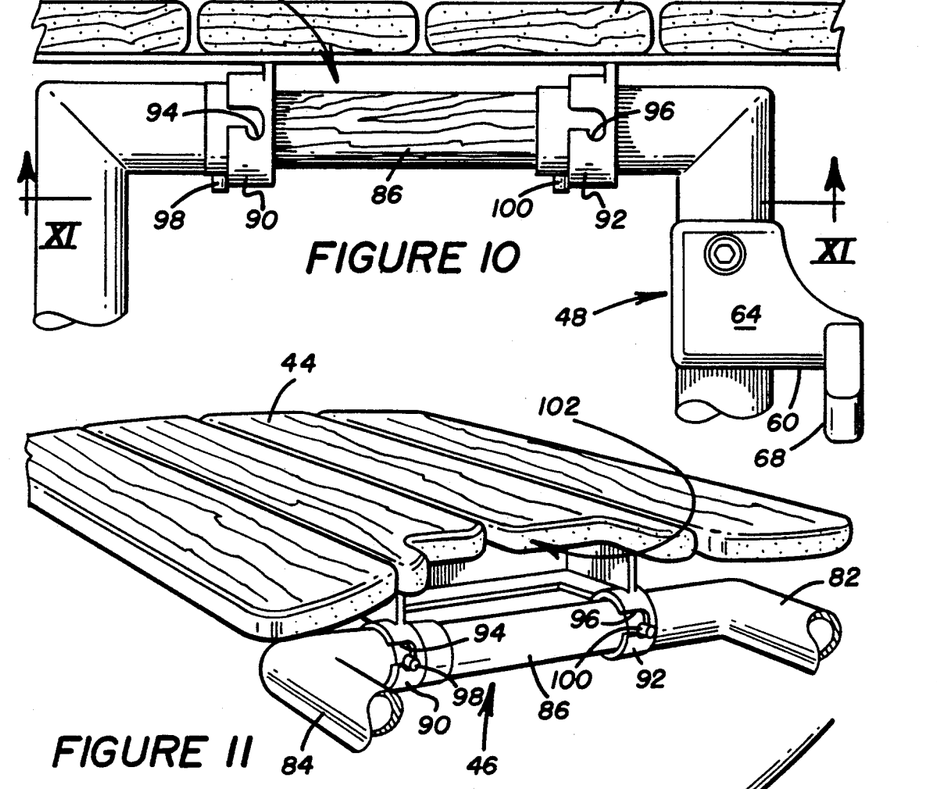
FIG. 10 is a top view corresponding to FIG. 9 while illustrating the handle, shelf and bracket being mounted on one leg assembly with the shelf in its vertical suspended position.
FIG. 11 is a pictorial fragmentary view of the leg assembly of FIGS. 9 and 10 while illustrating slot and pin combinations for movably positioning the shelf.

Referring particularly to FIGS. 9, 10, and 11, the leg assembly 28 is formed from structural tubing to include front and back legs 78 and 80 respectively. In addition, tubular portions 82 and 84 of the leg assembly are arranged in coaxial relation to each other, adjacent the end of the bowl 22, for receiving a cylindrical handle 86 therebetween. Preferably, the handle 86 is formed from a material such as wood with poor heat transfer characteristics in order to permit moving of the barbecue grill assembly 20 during use.

The leg assemblies are secured to the bowl 22 by saddles 87 which are shaped to generally conform to the curved surface of the bowl. The saddles are preferably welded to both the bowl 22 and leg assembly 28 or 30.

The leg assemblies 28 and 30 differ substantially only in the wheels 88 mounted beneath the legs 78 and 80 of the leg assembly 30.

The movable shelf 44 is also preferably formed from wood and includes mounting brackets 90 and 92 which are rotatable and axially movable upon the tubular portions 82 and 84 of the leg assemblies. Referring particularly to FIG. 11, the rotary brackets 90 and 92 are formed with curved slots 94 and 96 for receiving projecting pins 98 and 100 on the tubular portions 82 and 84 of the leg assembly. The movable shelf or tray 44 is also formed with a cutout 102 between the mounting brackets 90 and 92 and adjacent the handle 76.

With this arrangement, the cutout 102 in the tray leaves the handle 76 exposed with the shelf or tray 44 either in its erect position illustrated in FIG. 1 or its suspended position. At the same time, particularly with the shelf 44 in its suspended position as illustrated in FIG. 11, the slot and pin combinations 94, 98 and 96, 100 are exposed to a user to clearly indicate how the shelf 44 can be moved to an erect position.

In that regard, it is only necessary to rotate the shelf so that the pins 98 and 100 are in lateral portions of the slots 94 and 96. The shelf may then be moved laterally for aligning the pins 98 and 100 with either the short vertical portions at one end of the respective slots or at the other end of the slots. With the pins in the short portions of the slots, the shelf 44 is maintained in its erect position illustrated in FIG. 1. With the pins 98 and 100 at the other ends of the slots, the shelf 44 is permitted to rotate downwardly to its suspended position illustrated in FIG. 11.

Figure 12:
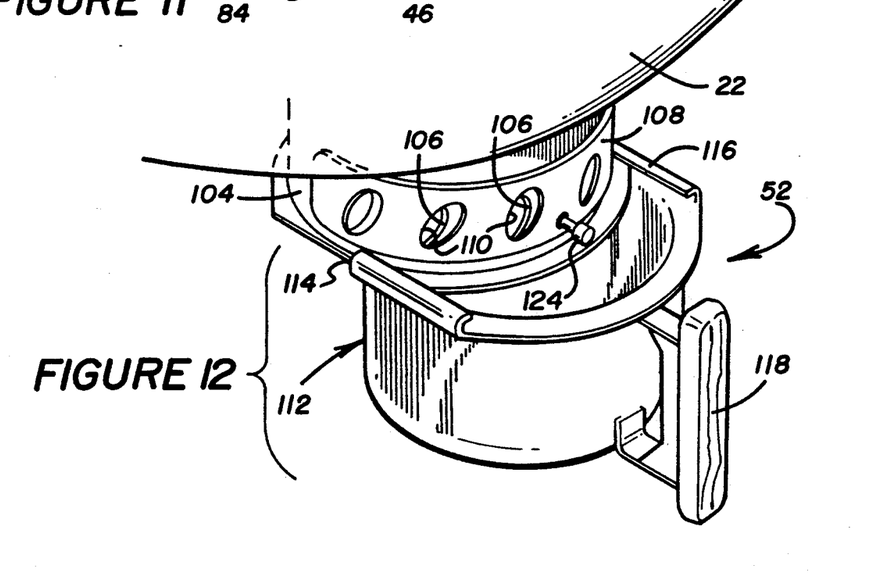
FIG. 12 is an enlarged fragmentary view of the ash collector with its vent collar rotated to a partially open position and the ash collector tray also in a partially open position.

Referring now to FIGS, 1 and 12, the ash collector assembly 52 includes a vertically extending tubular portion 104 formed with perforations 106. Preferably, the perforations 106 are inclined ellipses conforming to the overall configuration of the bowl and lid in combination. A collar 108 is movably mounted on the rounded portion 104 and includes similar perforations 110. Thus, the collar 108 may be moved or rotated in order to adjust the opening of the vent assembly 56 or to move the perforations 106 and 110 out of register with each other to entirely close the vent assembly 56. For example, a tab can be used to laterally adjust the collar 108 with respect to the tubular portion 104 for opening and closing the vent assembly 56.

An ash collector tray 112 is mounted beneath the vertically extending tubular portion 104 by mating, self-cleaning flanges 114 and 116 respectively form the bottom of the vertically extending tubular portion 104 and on an upper edge of the ash collector tray 112. The ash collector tray 112 also has a handle 118 to facilitate retraction of the collector tray 112 from the self-cleaning flanges 114 in order to empty ashes therefrom.

This combination of the ash collector assembly 52 is particularly advantageous in that the vent assembly 56 is formed on a vertical surface of the tubular extension 104 substantially above the ash collector tray 112. Thus, the design of the ash collector assembly 52 assures that the vent assembly 56 is not plugged and made inoperable by ashes collecting from the bowl 22.

The other vent assembly 58, arranged above the lid 24, is similarly adjustable for regulating air flow through the barbecue grill assembly. Because of the elliptical configuration of the lid, vent openings in the lid 24 itself are formed on a hemispherical portion 120 on the lid 24. The vent assembly includes a similar hemispherically formed movable vent member 122, the lid portion 120 and the movable vent member 122 forming respective perforations similar to those described for the vent assembly 56 and operable in a similar manner to regulate air flow through the barbecue grill assembly.

Figure 13:
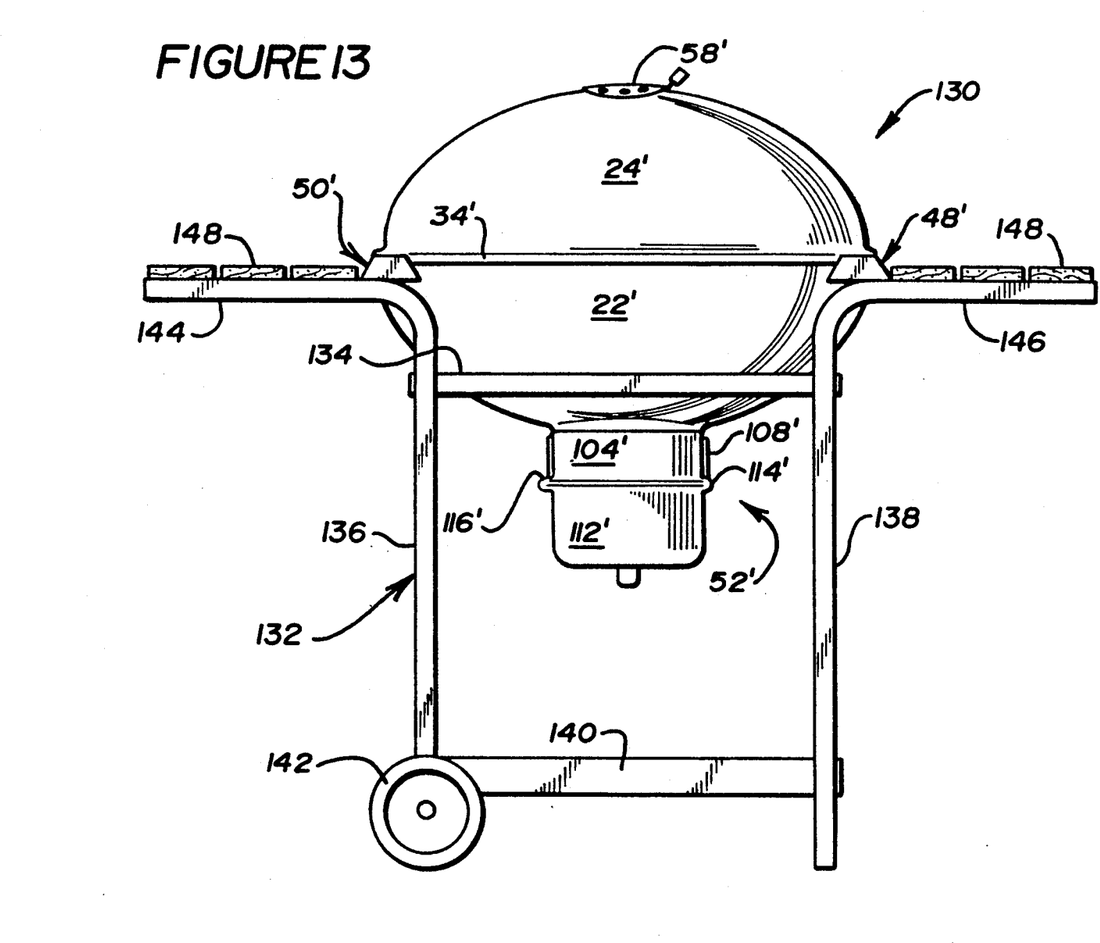
FIG. 13 is a front view of a barbecue grill assembly similar to that of FIGS. 1–12 but including a different support structure.

Another embodiment of a barbecue grill assembly constructed according to the invention is indicated at 130 in FIG. 13 and includes a substantially similar bowl, and other components as in FIGS. 1-12. The similar components are indicated by primed numerals corresponding to the numerals for the components in FIGS. 1-12.

The grill assembly 130 has a different support structure 132 also fabricated from tubular metal and having a central tray 134 suspended between leg assemblies 136 and 138 and cut out for receiving the bowl 22'. The support structure also has a lower structural shelf 140 and wheels, one being indicated at 142.

Laterally extending portions 144 and 146 on the support structure provide fixed mountings for shelves 148 at either end of the bowl similarly as the shelves 44 of FIGS. 1-12.

The support structure 132 also provides open access below a central portion of the bowl 22' for suspending the ash collector assembly 52' similarly as in FIGS. 1-12.

Accordingly, novel embodiments of barbecue grill assemblies constructed in accordance with the present invention have been described above. Various modifications and additions to the structure will be apparent from the preceding description and the following appended claims. In any event, the scope of the present invention is defined only by the following appended claims.

What is claimed is:

1. A barbecue grill assembly for cooking foods, comprising
   a bowl and domed, free-standing lid mating with each other and having a curved configuration at their intersection,
   support means for the bowl,
   a handle adjacent one side of the lid,
   cradle means for catching and supporting the lid, the cradle means including two brackets arranged on the bowl generally opposite the handle, the two brackets having extended surfaces facing each other and spaced apart less than a corresponding dimension of the lid with stop means arranged on end portions of the extended surfaces whereby lifting the lid by the handle causes the lid to move horizontally along the extended bracket surfaces and to rotate into a generally vertical position upon engagement with the stop means, the lid then being cradled by the bracket surfaces and stop means, and
   the support means comprising leg assemblies adjacent opposite longitudinal ends of the bowl, the brackets being mounted on the respective leg assemblies.

2. The barbecue grill assembly of claim 1 further comprising guide projections arranged or formed on a rim portion of the lid to rest above the respective brackets when the lid is in engagement with the extended surfaces.

3. The barbecue grill assembly of claim 1 wherein the bowl and lid have elliptically shaped openings at their mating intersection and a three-dimensional shape in combination corresponding to rotation of the elliptical opening about its longitudinal axis.

4. The barbecue grill assembly of claim 1 further comprising a handle mounted on one leg assembly.

5. The barbecue grill assembly of claim 4 further comprising a shelf and hinge means for supporting the shelf on the one leg assembly with the shelf either in an erect horizontal position or a suspended vertical position.

6. The barbecue grill assembly of claim 5 wherein the shelf is shaped to expose the handle when the shelf is in either its erect position or suspended position.

7. The barbecue grill assembly of claim 5 wherein the hinge means comprises two tubular brackets axially movable on respective tubular elements of the one leg assembly, pin and slot means being formed in combination by the tubular brackets and respective tubular leg assembly elements for maintaining the shelf in its erect position.

8. The barbecue grill assembly of claim 7 wherein the handle is mounted in coaxially aligned relation between the two tubular elements of the one leg assembly, the shelf being formed with a cutout adjacent the handle and exposing the respective pin and slot means.

9. The barbecue grill assembly of claim 8 wherein the bowl and lid have elliptically shaped openings at their mating intersection and a three-dimensional shape in combination corresponding to rotation of the elliptical opening about its longitudinal axis.

10. The barbecue grill assembly of claim 9 further comprising a similar handle, shelf and hinge means mounted on the other leg assembly.

11. The barbecue grill assembly of claim 6 wherein the bowl and lid have elliptically shaped openings at their mating intersection and a three-dimensional shape in combination corresponding to rotation of the elliptical opening about its longitudinal axis.

12. The barbecue grill assembly of claim 6 further comprising a similar handle, shelf and hinge means mounted on the other leg assembly.

13. The barbecue grill assembly of claim 4 wherein the support means comprises leg assemblies adjacent opposite longitudinal ends of the bowl and further comprising saddle means conforming to surface portions of the bowl for respectively securing the leg assemblies to the bowl.

14. The barbecue grill assembly of claim 13 wherein the bowl and lid have elliptically shaped mating openings and a three-dimensional shape in combination corresponding to rotation of the elliptical opening about its longitudinal axis and further comprising reinforcing means interconnecting the leg assemblies remote from the bowl.

15. The barbecue grill assembly of claim 14 further comprising a cooking grill having a central cooking area and positioned above a fuel grill in the bowl, a portion of the cooking grill in the central cooking area being hinged to facilitate placing fuel on the fuel grill.

16. The barbecue grill assembly of claim 1 wherein the support means permits access below a central portion of the bowl and further comprising an ash collector depending from the central bowl portion.

17. The barbecue grill assembly of claim 16 wherein the ash collector comprises a vertically arranged tubular element including vent means and attachment means for releasably securing an ash collector tray beneath the tubular element.

18. A barbecue grill assembly for cooking foods, comprising
   a bowl and domed, free-standing lid mating with each other and having a curved configuration at their intersection,
   support means for the bowl,
   a handle adjacent one side of the lid,
   cradle means for catching and supporting the lid, the cradle means including two brackets arranged on the bowl generally opposite the handle, the two brackets having extended surfaces facing each other and spaced apart less than a corresponding dimension of the lid with stop means arranged on end portions of the extended surfaces whereby lifting the lid by the handle causes the lid to move horizontally along the extended bracket surfaces and to rotate into a generally vertical position upon engagement with the stop means, the lid then being cradled by the bracket surfaces and stop means,
   the support means permitting access below a central portion of the bowl and further comprising an ash collector depending from the central bowl portion,
   the ash collector comprising a vertically arranged tubular element including vent means and attachment means for releasably securing an ash collector tray beneath the tubular element, and
   a cylindrical portion of the tubular element being perforated and the vent means comprising a perforated, rotatable collar surrounding the cylindrical portion.

19. A barbecue grill assembly for cooking foods, comprising
   a bowl and domed, free-standing lid mating with each other and having a curved configuration at their intersection,
   support means for the bowl including leg assemblies adjacent opposite ends of the bowl,
   a shelf,
   hinge means for supporting the shelf on one leg assembly with the shelf either in an erect horizontal position or a suspended vertical position, the shelf being shaped to expose a handle when the shelf is in either its erect position or suspended position, and
   the hinge means comprising two tubular brackets axially movable on respective tubular elements of the one leg assembly, pin and slot means being formed in combination by the tubular brackets and respective tubular leg assembly elements for maintaining the shelf in its erect position.

20. The barbecue grill assembly of claim 19 wherein a handle is mounted in coaxially aligned relation between the two tubular elements of the one leg assembly, the shelf being formed with a cutout adjacent the handle and exposing the respective pin and slot means.

21. The barbecue grill assembly of claim 20 wherein the bowl and lid have elliptical shaped openings at their mating intersection and a three-dimensional shape in combination corresponding to rotation of the elliptical opening about its longitudinal axis.

22. The barbecue grill assembly of claim 21 further comprising a similar handle, shelf and hinge means mounted on the other leg assembly.

23. A barbecue grill assembly for cooking foods, comprising
   a bowl and domed, free-standing lid mating with each other and having a curved configuration at their intersection,
   support means for the bowl including leg assemblies adjacent opposite ends of the bowl,
   a shelf,
   hinge means for supporting the shelf on one leg assembly with the shelf either in an erect horizontal position or a suspended vertical position, the shelf being shaped to expose a handle when the shelf is in either its erect position or suspended position, and
   saddle means conforming to surface portions of the bowl for respectively securing the leg assemblies to the bowl.

24. The barbecue grill assembly of claim 23 wherein the bowl and lid have elliptically shaped mating openings and a three-dimensional shape in combination corresponding to rotation of the elliptical opening about its longitudinal axis and further comprising reinforcing means interconnecting the leg assemblies remote from the bowl.

25. A barbecue grill assembly for cooking foods, comprising
   a bowl and domed, free-standing lid mating with each other and having a curved configuration at their intersection,
   support means for the bowl including leg assemblies adjacent opposite ends of the bowl,
   a shelf,
   hinge means for supporting the shelf on one leg assembly with the shelf either in an erect horizontal position or a suspended vertical position, the shelf being shaped to expose a handle when the shelf is in either its erect position or suspended position, and
   an ash collector depending from a central portion of the bowl.

26. A barbecue grill assembly for cooking foods, comprising
   a bowl and lid,
   support means for the bowl, the support means permitting access below a portion of the bowl, and
   an ash collector assembly depending from the accessible bowl portion, the ash collector assembly further comprising
   a vertically arranged tubular element opening at its upper end into the bowl,
   an ash collector tray,
   attachment means formed at a lower end of the tubular element for removably securing the ash collector tray in ash collecting relation beneath the tubular element, and adjustable vent means arranged on an intermediate portion of the tubular element between its upper and lower ends in order to assure that the event means are not plugged or made inoperable by ashes collected in the removable ash collector tray.

27. The barbecue grill assembly of claim 26 wherein a cylindrical portion of the tubular element is perforated and the vent means comprises a perforated, rotatable collar surrounding the cylindrical portion.

28. The barbecue grill assembly of claim 26 wherein the attachment means comprises horizontal flanges for slideably supporting the ash collector tray.

29. The barbecue grill assembly of claim 26 wherein the ash collector assembly depends from a central portion of the bowl and the bowl has a curved configuration to facilitate transfer of ashes through the tubular element to the ash collector tray.

30. The barbecue grill assembly of claim 29 wherein the bowl and lid have elliptically shaped openings at their mating intersection and a three-dimensional shape in combination corresponding to rotation of the elliptical opening about its longitudinal axis.

31. A barbecue grill assembly for cooking foods, comprising
a bowl and domed, free-standing lid mating with each other and having a curved configuration at their intersection,
support means for the bowl,
a handle arranged on one side of the lid adjacent its intersection with the bowl,
cradle means for catching and supporting the lid, the cradle means including two brackets arranged on an opposite side of the bowl from the handle, the two brackets having extended surfaces facing each other and spaced apart less than a corresponding dimension of the lid with stop means arranged on an end portion of each respective extended surface, the extended surfaces of the brackets being positioned slightly beneath the lid when the lid is normally covering the bowl whereby lifting the lid by the handle causes the lid to engage and move horizontally along the extended bracket surfaces and to rotate into a generally vertical position upon engagement with the stop means, the lid remaining engaged with the extended surfaces of the brackets while being lifted by the handle and then being cradled by the bracket surfaces and stop means.

32. The barbecue grill assembly of claim 31 further comprising guide projections arranged or formed on a rim portion of the lid to rest above the respective brackets when the lid is in engagement with the extended surfaces.

33. The barbecue grill assembly of claim 32 wherein the bowl and lid have elliptically shaped openings at their mating intersection and a three-dimensional shape in combination corresponding to rotation of the elliptical opening about its longitudinal axis.

34. The barbecue grill assembly of claim 31 wherein the bowl and lid have elliptically shaped openings at their mating intersection and a three-dimensional shape in combination corresponding to rotation of the elliptical opening about its longitudinal axis, the extended surfaces being beveled.

* * * * *

UNITED STATES PATENT AND TRADEMARK OFFICE
CERTIFICATE OF CORRECTION

PATENT NO. : 5,016,607
DATED      : May 21, 1991
INVENTOR(S) : Frederick G. Doolittle, et al.

It is certified that error appears in the above—identified patent and that said Letters Patent is hereby corrected as shown below:

On the title page of the patent, change the filing date from "February 9, 1989" to —February 7, 1989—.

Signed and Sealed this

Eighth Day of June, 1993

Attest:

MICHAEL K. KIRK

Attesting Officer

Acting Commissioner of Patents and Trademarks